(12) United States Patent
Fujita

(10) Patent No.: US 8,464,517 B2
(45) Date of Patent: Jun. 18, 2013

(54) METHOD OF CONTROLLING NOX PURIFICATION SYSTEM, AND NOX PURIFICATION SYSTEM

(75) Inventor: Tetsuya Fujita, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 344 days.

(21) Appl. No.: 12/736,090

(22) PCT Filed: Nov. 27, 2008

(86) PCT No.: PCT/JP2008/071501
§ 371 (c)(1),
(2), (4) Date: Oct. 26, 2010

(87) PCT Pub. No.: WO2009/113211
PCT Pub. Date: Sep. 17, 2009

(65) Prior Publication Data
US 2011/0041481 A1   Feb. 24, 2011

(30) Foreign Application Priority Data

Mar. 11, 2008   (JP) .................. 2008-061879

(51) Int. Cl.
*F01N 3/00* (2006.01)
*F01N 3/10* (2006.01)
(52) U.S. Cl.
USPC .......... 60/287; 60/286; 60/288; 60/295; 60/299; 60/301; 60/303
(58) Field of Classification Search
USPC ............. 60/286–288, 295, 299, 301, 303
See application file for complete search history.

(56) References Cited

U.S. PATENT DOCUMENTS

| | | | |
|---|---|---|---|
| 2008/0295499 A1* | 12/2008 | Driscoll et al. | 60/288 |
| 2010/0139250 A1* | 6/2010 | Andersson et al. | 60/285 |
| 2010/0199634 A1* | 8/2010 | Heaton | 60/274 |

FOREIGN PATENT DOCUMENTS

| | | |
|---|---|---|
| JP | 10-71325 | 3/1998 |
| JP | 2003-236343 | 8/2003 |
| JP | 2005-23921 | 1/2005 |
| JP | 2007-23872 | 2/2007 |
| JP | 2007-100510 | 4/2007 |
| JP | 2007-130580 | 5/2007 |
| JP | 2007-154819 | 6/2007 |

OTHER PUBLICATIONS

Patent Abstracts of Japan, Publication No. 2007-100510, Published Apr. 19, 2007.
Patent Abstracts of Japan, Publication No. 2003-236343, Published Aug. 26, 2003.

(Continued)

*Primary Examiner* — Kenneth Bomberg
*Assistant Examiner* — Audrey K Bradley
(74) *Attorney, Agent, or Firm* — Staas & Halsey LLP

(57) ABSTRACT

Method to reduce NOx contained in an exhaust gas by including an oxidation catalyst device and a selective reduction type NOx catalyst device, which are arranged in this order from an upstream side, and a NOx purification system. Whether a volume of $NO_2$ adsorbed in the oxidation catalyst device increases or decreases is estimated, and a flow rate of exhaust gas which bypasses the oxidation catalyst device on a basis of the increase or decrease in the estimated volume of adsorbed $NO_2$ is controlled. This avoids incorrect supply of ammonia.

10 Claims, 5 Drawing Sheets

OTHER PUBLICATIONS

Patent Abstracts of Japan, Publication No. 10-071325, Published Mar. 17, 1998.
Patent Abstracts of Japan, Publication No. 2007-130580, Published May 31, 2007.
Patent Abstracts of Japan, Publication No. 2005-023921, Published Jan. 27, 2005.
Patent Abstracts of Japan, Publication No. 2007-023872, Published Feb. 1, 2007.
Patent Abstracts of Japan, Publication No. 2007-154819, Published Jun. 21, 2007.
International Search Report mailed Mar. 3, 2009 in PCT/JP2008/071501.

* cited by examiner

METHOD OF CONTROLLING NOX PURIFICATION SYSTEM, AND NOX PURIFICATION SYSTEM

This application claims the benefit under U.S.C. Section 371, of PCT International Application No. PCT/JP2008/071501, filed Nov. 27, 2008 and Japanese Application No. 2008-061879 filed Mar. 11, 2008, the contents of which are incorporated herein by reference.

TECHNICAL FIELD

The present invention relates to a method of controlling a NOx purification system which includes an oxidation catalyst device on an upstream side of an exhaust gas passage and a selective reduction type NOx catalyst (SCR catalyst) device on a downstream side of the exhaust gas passage, and to the NOx purification system.

BACKGROUND ART

A NOx purification system using a selective reduction type NOx catalyst device has been put in practical use in order to process NOx (nitrogen oxide) in an atmosphere of excessive oxygen in a process for the purification of an exhaust gas from a diesel engine. This NOx purification system provided with the selective reduction type NOx catalyst device includes: a selective reduction type NOx catalyst (SCR catalyst) device for selectively reducing NOx by using ammonia ($NH_3$) as a reducing agent; and as an ammonia supply source, an ammonia-based solution supply unit for adding an ammonia-based solution, such as an aqueous urea solution, to the exhaust gas, which is installed in a stage before, i.e., at an upstream side of the selective reduction type NOx catalyst device.

The aqueous urea solution (($NH_2)_2CO$) added to the exhaust gas from this ammonia-based solution supply unit is hydrolyzed and thus produces ammonia through a reaction represented by Reaction Formula (1) "$(NH_2)_2CO+H_2O \rightarrow 2NH_3+CO_2$." The ammonia thus produced is used as a reducing agent in the selective reduction type NOx catalyst device to purify NOx. This selective reduction type NOx catalyst device reacts ammonia and NOx with each other through reactions represented by Reaction Formula (2) "$4NH_3+4NO+O_2 \rightarrow 4N_2+6H_2O$," Reaction Formula (3) "$2NH_3+NO+NO_2 \rightarrow 2N_2+3H_2O$," and Reaction Formula (4) "$8NH_3+6NO_2 \rightarrow 7N_2+12H_2O$." Thereby, the selective reduction type NOx catalyst device reduces NOx to nitrogen.

It is considered that: among these reactions, the reaction represented by Formula (3) progresses more easily than the reaction represented by Formula (2) and the reaction represented by Formula (4) under a low temperature; and the reaction represented by Formula (3) progresses most easily when a ratio (molar ratio) of NO (nitric oxide) to $NO_2$ (nitrogen dioxide) is 1:1, i.e., when a proportion (molar ratio) of $NO_2$ in NOx is 50%. Nevertheless, almost all of NOx contained in the exhaust gas discharged from the engine is NO. With this taken into consideration, employed is a method of enhancing the capability to purify NOx under a low temperature by installing an oxidation catalyst device, which oxidizes part of NO contained in the exhaust gas to $NO_2$, at an upstream side of the ammonia-based solution supply unit.

In relation to this, for instance, Japanese patent application Kokai publication No. 2007-154819 proposes the following method of enhancing the capability to purify NOx under a low temperature. This method makes a ratio of NO to $NO_2$ in the exhaust gas, which flows into an SCR catalyst (selective reduction type NOx catalyst), closer to 1:1 as much as possible, which is advantageous for the purification of NOx under the low temperature. To this end, the method causes part or all of an exhaust gas G discharged from an engine to be supplied to the SCR catalyst (selective reduction type NOx catalyst) after causing the part or all of the exhaust gas G to pass a NO oxidation catalyst (oxidation catalyst), and causes the remaining part of the exhaust gas G to be supplied to the SCR catalyst through a bypass passage which does not allow the remaining part of the exhaust gas G to pass the NO oxidation catalyst. In this respect, with consideration being given to conditions and the like of the exhaust gas and the capability of the NO oxidation catalyst in oxidizing NO, the method enhances the capability to purify NOx under the low temperature by: controlling the flow rate of the exhaust gas G to be allowed to pass the NO oxidation catalyst and the flow rate of the exhaust gas G to be supplied to the SCR catalyst without being allowed to pass the NO oxidation catalyst; and thus making the ratio of NO to $NO_2$ closer to 1:1. In addition, Japanese patent application Kokai publication No. 2007-154819 proposes a method of preventing the deterioration of the NO oxidation catalyst by allowing no exhaust gas G to pass the NO oxidation catalyst when the temperature of the exhaust gas G is high.

However, the adsorptivity of $NO_2$ produced through the oxidation using the oxidation catalyst is far higher than that of NO. For this reason, until the adsorption of $NO_2$ reaches saturation, $NO_2$ produced by using the oxidation catalyst is adsorbed to the oxidation catalyst. As a result, only unreacted NO is supplied to the selective reduction type NOx catalyst, but no $NO_2$ is supplied to the selective reduction type NOx catalyst.

On the other hand, if the temperature rises after the volume of adsorbed $NO_2$ reaches saturation, $NO_2$ is released due to decrease in the saturation volume of $NO_2$ adsorbed to the oxidation catalyst along with the temperature rise. For this reason, an unexpectedly large volume of NOx is supplied to the selective reduction type NOx catalyst.

Accordingly, the ratio of NO to $NO_2$ and the volume of NOx which flows into the selective reduction type NOx catalyst vary largely depending on how much of $NO_2$ is adsorbed to the oxidation catalyst. Thus, the estimation of the ratio of NO to $NO_2$ with the method of the conventional technique which gives no consideration to the adsorption of $NO_2$ is inaccurate. Consequently, the conventional method cannot achieve the object of enhancing the rate of NOx purification by controlling the ratio of NO to $NO_2$.

Variation in the ratio of NO to NO2 results in variation in the activity in purification, and accordingly leads to variation in an amount of ammonia to be consumed, namely a necessary amount of ammonia-based solution such as an aqueous urea solution. For this reason, it is highly likely that ammonia slip occurs due to the excessive amount of ammonia-based solution to be added, and that the capability to purify NOx decreases to a large extent due to the insufficient amount of ammonia-based solution to be added.

Patent Document 1: Japanese patent application Kokai publication No. 2007-154819

SUMMARY OF THE INVENTION

The present invention has been made in view of the foregoing situation. An object of the present invention is to provide a method of controlling a NOx purification system and the NOx purification system that allow avoiding problems which occur due to shortage and excessive supply of ammonia by: estimating how much of NO2 is adsorbed in an oxidation catalyst device; thus making the ratio of NO to NO2 in NOx, which flows into a selective reduction type NOx catalyst device, closer to 1:1 as much as possible; and adding a necessary amount of ammonia-based solution.

A method of controlling a NOx purification system according to the present invention for achieving the above object is a method of controlling a NOx purification system configured to reduce NOx contained in an exhaust gas. The system includes: an oxidation catalyst device, an ammonia-based solution supply unit, and a selective reduction type NOx catalyst device which are arranged in order from an upstream side of an exhaust gas passage, the ammonia-based solution supply unit configured to supply an ammonia-based solution to the exhaust gas passage; a bypass passage branching from the exhaust gas passage at an upstream side of the oxidation catalyst device and joining together with the exhaust gas passage at an upstream of the ammonia-based solution supply unit; and an exhaust gas flow-rate control unit configured to control a flow rate of the exhaust gas which flows through the bypass passage, the system also including a control unit configured to control an amount of the ammonia-based solution to be supplied. The method is characterized in that whether a volume of $NO_2$ adsorbed in the oxidation catalyst device increases or decreases is estimated on a basis of volumes of NOx respectively in stages before and after the oxidation catalyst device, and a flow rate of the exhaust gas which passes the oxidation catalyst device and a flow rate of the exhaust gas which passes the bypass passage are controlled on a basis of the increase or decrease in the estimated volume of adsorbed $NO_2$.

The volume of NOx in the stage before this oxidation catalyst device and the volume of NOx in the stage after the oxidation catalyst device can be estimated on the basis of: NOx concentrations detected by NOx concentration sensors placed in the stages before and after the oxidation catalyst device; and a flow rate of exhaust gas calculated from a volume of intake air and a quantity of injected fuel. Thus, the volume of adsorbed NOx can be estimated on the basis of the difference in the volume of NOx between the prior stage and the posterior stage. Furthermore, the NOx concentration at the upstream side of (in the stage before) the oxidation catalyst device can be estimated on the basis of an engine speed, load (a flow rate of fuel) and the like by referring to map data which is beforehand set up through an experiment and the like.

The increase and decrease in the volume of $NO_2$ adsorbed in the oxidation catalyst device is estimated in a way that: when the volume of NOx at the upstream side of the oxidation catalyst device is larger than the volume of NOx at the downstream side of the oxidation catalyst device, the volume of $NO_2$ adsorbed in the oxidation catalyst device increases; when the volume of NOx at the upstream side of the oxidation catalyst device is smaller than the volume of NOx at the downstream side of the oxidation catalyst device, the volume of $NO_2$ adsorbed in the oxidation catalyst device decreases; and when the volume of NOx at the upstream side of the oxidation catalyst device is equal to the volume of NOx at the downstream side of the oxidation catalyst device, the volume of $NO_2$ adsorbed in the oxidation catalyst device neither increases nor decreases. Note that, as to the estimation that the volume of $NO_2$ adsorbed in the oxidation catalyst device neither increases nor decreases, it may be judged that the volume of $NO_2$ adsorbed in the oxidation catalyst device neither increases nor decreases even if there is an increase or decrease to some extent for the purpose of avoiding the hunting of the control. In other words, a range of variation may be permitted between a value for judgment that the volume of $NO_2$ adsorbed in the oxidation catalyst device increases, and a value for judgment that the volume of $NO_2$ adsorbed in the oxidation catalyst device decreases.

This method of controlling a NOx purification system makes it possible for the NOx purification system, in which the oxidation catalyst device for oxidizing NO contained in the exhaust gas to $NO_2$ is installed in the stage before (at the upstream side of) the selective reduction type NOx catalyst device, to judge whether or not the adsorption of $NO_2$ in the oxidation catalyst device reaches saturation, to control the amount of exhaust gas to be allowed to pass the bypass passage (to be not allowed to pass the oxidation catalyst device) on the basis of the estimated volume of adsorbed $NO_2$, and thereby to control the volume of NO in the exhaust gas to be converted to $NO_2$.

By this, the method can enhance the capability of the NOx purification system, which includes the selective reduction type NOx catalyst device, in purifying NOx. In addition, the method enables the NOx purification system to optimize the amount of ammonia-based solution corresponding to the ratio of NO to $NO_2$ in the exhaust gas which flows into the selective reduction type NOx catalyst device, and thus to supply the optimized amount of ammonia to the selective reduction type NOx catalyst device. As a consequence, the method can enhance the capability of the NOx purification system in purifying NOx. In addition, the method enables the NOx purification system to remarkably decrease the volume of NOx flowing out therefrom, and concurrently to prevent the ammonia slip.

In the method of controlling a NOx purification system, when the estimated volume of adsorbed $NO_2$ increases, the flow rate of the exhaust gas which passes the bypass passage is set to zero. When the estimated volume of adsorbed $NO_2$ decreases, part of the exhaust gas is caused to pass the bypass passage, and the remaining part of the exhaust gas is caused to pass the oxidation catalyst device. When the estimated volume of adsorbed $NO_2$ neither increases nor decreases, a proportion (molar ratio) of $NO_2$ in NOx contained in the exhaust gas which flows out of the oxidation catalyst device is estimated. When the estimated proportion of $NO_2$ therein is not larger than 50%, all of the exhaust gas is caused to pass the oxidation catalyst device. When the estimated proportion of $NO_2$ therein is larger than 50%, part of the exhaust gas is caused to pass the bypass passage, and the remaining part of the exhaust gas is caused to pass the oxidation catalyst device.

This makes it possible for the selective reduction type NOx catalyst device to make the proportion of $NO_2$ (or the ratio of NO to $NO_2$) in the exhaust gas, which flows into the selective reduction type NOx catalyst device, closer to 50% (or 1:1) as a proportion of $NO_2$ therein (or a ratio of NO to $NO_2$) which enables ammonia and NOx to efficiently react with each other.

In the method of controlling a NOx purification system, when the part of the exhaust gas is caused to pass the bypass passage and the remaining part of the exhaust gas is caused to pass the oxidation catalyst device, an amount of the exhaust gas to be allowed to pass the bypass passage is controlled in order that the proportion of $NO_2$ which flows into the selective reduction type NOx catalyst device becomes equal to 50%.

This makes it possible to more accurately estimate the proportion of $NO_2$ in the stage after the oxidation catalyst device. For this reason, when the thus-estimated proportion of $NO_2$ therein is reflected on the controlling of the flow rate of the exhaust gas, the selective reduction type NOx catalyst device is capable of more accurately making the proportion of $NO_2$ (or the ratio of NO to $NO_2$) in the exhaust gas, which flows into the selective reduction type NOx catalyst device, closer to 50% (or 1:1) as a proportion of $NO_2$ therein (or a ratio of NO to $NO_2$) which enables ammonia and NOx to react with each other efficiently. Accordingly, the capability to purify NOx is further enhanced.

In the method of controlling a NOx purification system, in a case where a proportion of $NO_2$ in the exhaust gas which flows into the selective reduction type NOx catalyst device is estimated when the estimated volume of adsorbed $NO_2$ decreases, the estimation of the proportion of $NO_2$ in the exhaust gas which flows out of the oxidation catalyst device is based on a condition of an equilibrium composition between NO and $NO_2$ which is determined by a temperature of the oxidation catalyst device and an oxygen concentration in the exhaust gas. Thereby, the method makes it possible to easily estimate the proportion of $NO_2$ in the exhaust gas which flows out of the oxidation catalyst device.

In addition, an exhaust gas purification system according to the present invention for achieving the above object is a NOx purification system configured to reduce NOx contained in an exhaust gas. The system includes: an oxidation catalyst device, an ammonia-based solution supply unit, and a selective reduction type NOx catalyst device which are arranged in order from an upstream side of an exhaust gas passage, the ammonia-based solution supply unit configured to supply an ammonia-based solution to the exhaust gas passage; a bypass passage branching from the exhaust gas passage at an upstream side of the oxidation catalyst device and joining together with the exhaust gas passage at an upstream of the ammonia-based solution supply unit; and an exhaust gas flow-rate control unit configured to control a flow rate of the exhaust gas which flows through the bypass passage, the system also including a control unit configured to control an amount of the ammonia-based solution to be supplied. The system is configured in a way that the control unit estimates whether a volume of $NO_2$ adsorbed in the oxidation catalyst device increases or decreases on a basis of volumes of NOx respectively in stages before and after the oxidation catalyst device, and controls a flow rate of the exhaust gas which passes the oxidation catalyst device and a flow rate of the exhaust gas which passes the bypass passage on a basis of the increase or decrease in the estimated volume of adsorbed $NO_2$.

The exhaust gas purification system is configured in a way that the control unit: performs control such that the flow rate of the exhaust gas which passes the bypass passage is set to zero, when the estimated volume of adsorbed $NO_2$ increases; performs control such that part of the exhaust gas is caused to pass the bypass passage and the remaining part of the exhaust gas is caused to pass the oxidation catalyst device, when the estimated volume of adsorbed $NO_2$ decreases; estimates a proportion (molar ratio) of $NO_2$ in NOx contained in the exhaust gas which flows out of the oxidation catalyst device, when the estimated volume of adsorbed $NO_2$ neither increases nor decreases; performs control such that all of the exhaust gas is caused to pass the oxidation catalyst device, when the estimated proportion of $NO_2$ therein is not larger than 50%; and performs control such that part of the exhaust gas is caused to pass the bypass passage and the remaining part of the exhaust gas is caused to pass the oxidation catalyst device, when the estimated proportion of $NO_2$ therein is larger than 50%.

Further, the NOx purification system is configured in a way that, when the control unit causes the part of the exhaust gas to pass the bypass passage, and the remaining part of the exhaust gas to pass the oxidation catalyst device, the control unit controls an amount of the exhaust gas to be allowed to pass the bypass passage in order that the proportion of $NO_2$ which flows into the selective reduction type NOx catalyst device becomes equal to 50%.

The NOx purification system is configured in a way that, in a case where the control unit estimates a proportion of $NO_2$ in the exhaust gas which flows into the selective reduction type NOx catalyst device when the estimated volume of adsorbed $NO_2$ decreases, the control unit estimates the proportion of $NO_2$ in the exhaust gas which flows out of the oxidation catalyst device based on a condition of an equilibrium composition between NO and $NO_2$ which is determined by a temperature of the oxidation catalyst device and an oxygen concentration in the exhaust gas.

The NOx purification system is capable of carrying out the method of controlling a NOx purification system, and accordingly bringing about the same effects.

The method of controlling a NOx purification system and the NOx purification system according to the present invention causes the NOx purification system, in which the oxidation catalyst device for oxidizing NO in the exhaust gas to $NO_2$ is installed in the stage before (at the upstream side of) the selective reduction type NOx catalyst device, to judge whether or not the adsorption of $NO_2$ in the oxidation catalyst device reaches saturation on the basis of the increase or decrease in the volume of adsorbed $NO_2$, and thus to control the amount of exhaust gas to be allowed to pass the bypass passage on the basis of the estimated volume of adsorbed $NO_2$. This allows controlling the volume of NO in the exhaust gas to be converted to $NO_2$.

In addition, the method and the system according to the present invention allows estimating the proportion of $NO_2$ (or the ratio of NO to $NO_2$) in NOx which flows into the selective reduction type NOx catalyst device on the basis of the increase or decrease in the volume of $NO_2$ adsorbed in the oxidation catalyst device, and accordingly to reflect the purification capability of the selective reduction type NOx catalyst device corresponding to the difference in the proportion of $NO_2$.

This enhances the capability of the selective reduction type NOx catalyst device in purifying NOx, and allows supplying ammonia to the selective reduction type NOx catalyst device neither too much nor too little by optimizing the amount of ammonia-based solution corresponding to the ratio of NO to $NO_2$ in the exhaust gas which flows into the selective reduction type NOx catalyst device. Accordingly, the capability of the NOx purification system in purifying NOx is enhanced, and thereby the NOx purification system is capable of reducing the volume of NOx to flow out therefrom, and also preventing the ammonia slip.

EXPLANATION OF REFERENCE SIGNS

Figure 1:
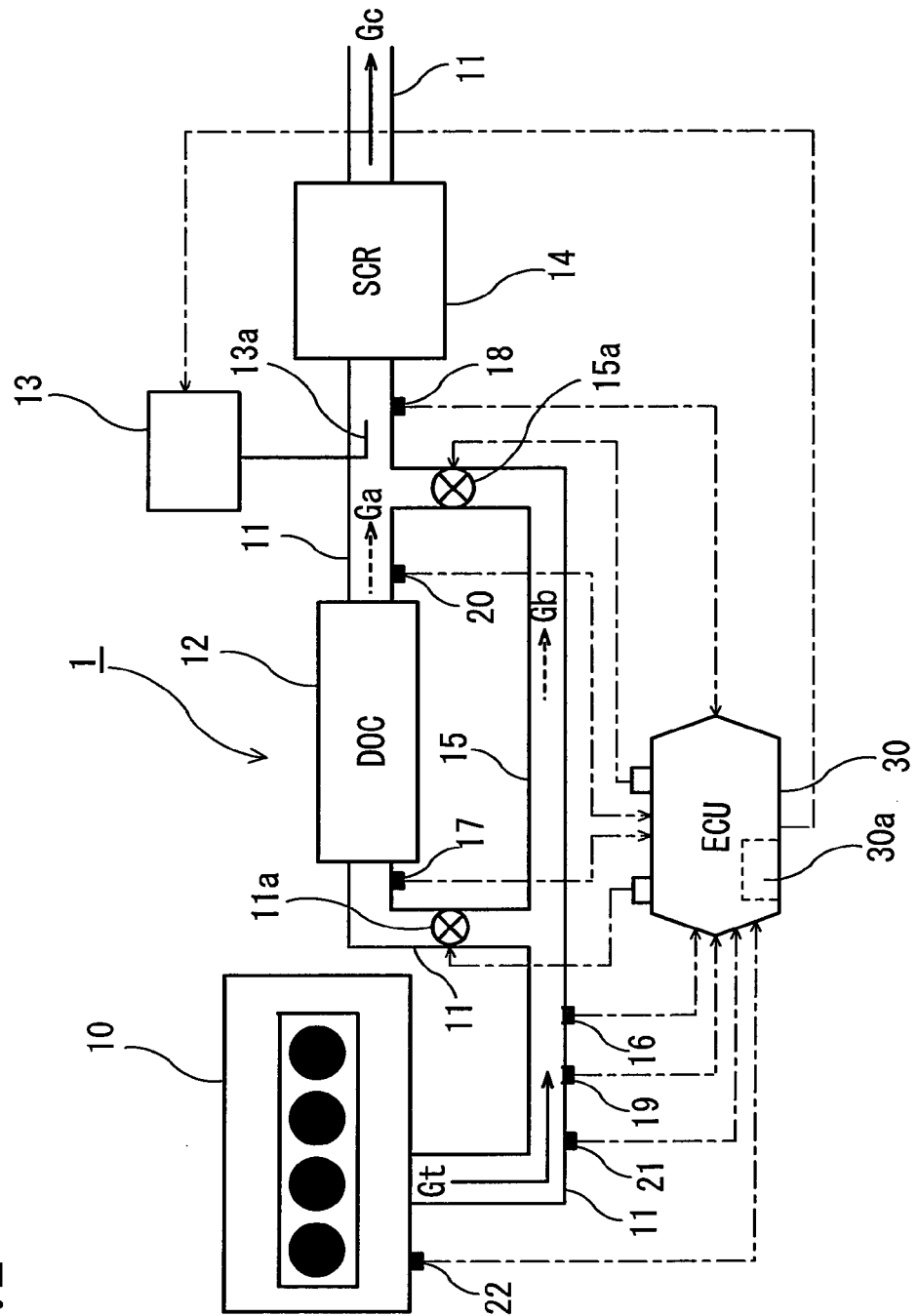
FIG. 1 is a diagram showing a configuration of a NOx purification system according to an embodiment of the present invention.

1 NOx purification system
10 diesel engine
11 exhaust gas passage
11a first flow-rate control valve
12 oxidation catalyst device (DOC)
13 ammonia-based solution supply unit
13a injection valve
14 selective reduction type NOx catalyst device (SCR)
15 bypass passage
15a second flow-rate control valve
16 first exhaust gas temperature sensor
17 second exhaust gas temperature sensor
18 third exhaust gas temperature sensor
19 first NOx concentration sensor
20 second NOx concentration sensor
21 oxygen concentration sensor
22 engine operating condition detector
30 control unit (ECU)
30a supply amount controller
An, An1, Ana, Anb, Anc amount of ammonia
Cn1 first NOx concentration
Cn2 second NOx concentration
Co oxygen concentration
Ga exhaust gas which passes oxidation catalyst device
Gb exhaust gas which passes bypass passage
Gc exhaust gas which flows into selective reduction type NOx catalyst device
Gt exhaust gas exhausted from engine
Lc amount of ammonia-based solution to be supplied
Ne engine speed
Q quantity of injected fuel (or load)
Tca temperature of catalyst in oxidation catalyst device
Tcc temperature of catalyst in selective reduction type catalyst device
Va volume of intake air
Vga first exhaust gas flow rate
Vgb second exhaust gas flow rate
Vn volume of adsorbed $NO_2$
Vn1 volume of NOx to flow into oxidation catalyst device
Vn2 volume of NOx to flow out of oxidation catalyst device
Vna, Vnai, Vnb, Vnc volume of NOx
Vna1, Vnai1, Vnb1, Vnc1 volume of NO
Vna2, Vna4, Vna5, Vnai2, Vnb2, Vnc2 volume of NO2
Vna3 volume of NO to be converted to NO2 by oxidation catalyst device
Vnc volume of NOx to flow into selective reduction type NOx catalyst device
Vnf saturation volume of adsorbed NO2
Vnt volume of NOx to flow out of engine
α1 proportion of NO2 in NOx contained in exhaust gas which is discharged from oxidation catalyst device
α2 proportion of NO2 in exhaust gas in bypass passage
αc proportion of NO2 in NOx contained in exhaust gas which flows into selective reduction type NOx catalyst device
βa rate of NO to be converted (oxidized) to NO2
ηe rate of NOx purification
ΔVn amount of increase or decrease in volume of adsorbed NO2
ΔVn1 predetermined first judgment value
ΔVn2 predetermined second judgment value
ΔCn1 predetermined first judgment concentration
ΔCn2 predetermined second judgment concentration

DESCRIPTION OF THE EMBODIMENTS

Referring to the drawings, descriptions will be provided for a method of controlling a NOx purification system and the NOx purification system according to an embodiment of the present invention by citing a NOx purification system for purifying NOx in an exhaust gas which passes an exhaust gas passage of a diesel engine.

FIG. 1 shows a configuration of a NOx purification system 1 according to an embodiment of the present invention. In this NOx purification system 1, to an exhaust gas passage 11 of a diesel engine 10, an oxidation catalyst device (DOC) 12, an ammonia-based solution supply unit 13 for supplying an ammonia-based solution to the exhaust gas passage 11, and a selective reduction type NOx catalyst device (SCR) 14 are provided in this order from an upstream side of the exhaust gas passage 11. In addition, a bypass passage 15 which bypasses the oxidation catalyst device 12 is provided in a way to branch from the exhaust gas passage 11 at an upstream side of the oxidation catalyst device 12, and to join together at a point between the oxidation catalyst device 12 and an injection valve 13a of the ammonia-based solution supply unit 13. Furthermore, a first flow-rate control valve 11a is provided to the exhaust gas passage 11 in order to control a first exhaust gas flow rate Vga of an exhaust gas Ga which passes the oxidation catalyst device 12, whereas a second flow-rate control valve 15a is provided to the bypass passage 15 in order to control a second exhaust gas flow rate Vgb of an exhaust gas Gb which passes the bypass passage 15. The first and second flow-rate control valves 11a and 15a are configured to be capable of controlling the exhaust gas flow rates Vga and Vgb, respectively.

The oxidation catalyst device 12 is formed in a way that palladium, cerium oxide, platinum, aluminum oxide and the like are supported on a support with a honeycomb structure or the like which is made of a porous ceramic such as a cordierite honeycomb. This oxidation catalyst device 12 oxidizes unburned fuel (hydrocarbon: HC), carbon monoxide (CO) and the like, if they exist in the exhaust gas Ga. Thus, the oxide catalyst device 12 raises the temperature of the exhaust gas Ga by use of the heat which is generated by this oxidation. The temperature of the selective reduction type NOx catalyst device 14, which is installed downstream of the oxidation catalyst device 12, can be raised by this exhaust gas Ga whose temperature has been raised.

This oxidation catalyst device 12 has a characteristic of adsorbing NOx in addition to the oxidizing of NOx (nitrogen oxide) and HC (hydrocarbon). In other words, the oxidation catalyst device 12 oxidizes NO (nitric oxide) to $NO_2$ (nitrogen dioxide), as well as adsorbs and holds $NO_2$ thus obtained. $NO_2$ held by this oxidation catalyst device 12 comes off and is discharged from the oxidation catalyst device 12, when the rise in the temperature of the exhaust gas makes the catalytic temperature of the oxidation catalyst equal to or higher than a certain temperature. As shown FIG. 3, a saturation volume Vnf of adsorbed $NO_2$ (indicated by a line L) in this oxidation catalyst device 12 becomes smaller as the catalytic temperature Tca becomes higher.

The ammonia-based solution supply unit 13 supplies the selective reduction type NOx catalyst device 14 with NH3 (ammonia) which is used as a reducing agent when NOx is reduced. The ammonia-based supply unit 13 is configured by including the injection valve 13a for injecting the ammonia-based solution, such as an aqueous urea solution or an ammonia solution, from an ammonia-based solution tank (not illustrated) to the exhaust gas passage 11.

The selective reduction type NOx catalyst device 14 is formed in away that titania-vanadium, zeolite, chromium oxide, manganese oxide, molybdenum oxide, titanium oxide, tungsten oxide and the like are supported by a support with a honeycomb structure or the like which is made of cordierite, aluminum oxide, titanium oxide and the like. With this structure, the selective reduction type NOx catalyst device 14 has a function of reducing and purifying NOx with ammonia.

Furthermore, a first exhaust gas temperature sensor 16 is installed in the exhaust gas passage 11 at a position immediately after the engine 10; a second exhaust gas temperature sensor 17 is installed in the exhaust gas passage 11 at a position upstream of the oxidation catalyst device 12; and a third exhaust gas temperature sensor 18 is installed in the exhaust gas passage 11 at a position upstream of the selective reduction type NOx catalyst device 14. The first exhaust gas temperature sensor 16 detects a temperature of an exhaust gas Gt which is discharged from the engine 10; the second exhaust gas temperature sensor 17 detects a temperature of the exhaust gas Ga which flows into the oxidation catalyst device 12; and the third exhaust gas temperature sensor 18 detects a temperature of an exhaust gas Gc which flows into the selective reduction type NOx catalyst device 14.

Moreover, a first NOx concentration sensor 19 is installed in the exhaust gas passage 11 at a position immediately after the engine 10; and a second NOx concentration sensor 20 is installed in the exhaust gas passage 11 at a position immediately after the oxidation catalyst device 12. A volume Vn of $NO_2$ adsorbed in the oxidation catalyst device 12 is estimated by use of detection values Cn1, Cn2 of the respective NOx concentration sensors 19, 20. In short, the volume Vn of adsorbed $NO_2$ is estimated. In addition, an oxygen concentration sensor 21 for detecting a concentration Co of oxygen in the exhaust gas Gt is installed in the exhaust gas passage 11 at a position immediately after the engine 10.

Note that: this first NOx concentration sensor 19 is necessary when a volume Vn1 of NOx discharged from the engine 10 is calculated from the NOx concentration Cn1 at the upstream side of the oxidation catalyst device 12; however, the first NOx concentration sensor 19 is not necessary when the volume Vn1 of NOx discharged from the engine 10 is estimated from map data on the volume of discharged NOx.

The engine 10 is also provided with an engine operating condition detector 22 for detecting various sets of data indicating an engine speed Ne, a quantity Q of injected fuel (or load), a temperature of a coolant, and the like. The engine 10 is further provided with a control unit 30, which is termed as an engine control unit (ECU), for controlling all the operation of this engine 10. In addition, a supply amount controller 30a for the ammonia-based solution, which is configured to control the supply of the ammonia-based solution and an amount Lc of supplied ammonia-based solution, is embedded in the control unit 30.

This supply amount controller 30a controls the first flow-rate control valve 11a, the second flow-rate control valve 15a and the injection valve 13a of the ammonia-based solution supply unit 13 on the basis of input values representing the operating conditions (for instance, the engine speed Ne, the quantity Q of injected fuel) of the engine 10, the NOx concentrations Cn1, Cn2, the temperature of the exhaust gas, and the like. Thus, the supply amount controller 30a adjusts the first exhaust gas flow rate Vga of the exhaust gas Ga which flows through the oxidation catalyst device 12, and the second exhaust gas flow rate Vgb of the exhaust gas Gb which flows through the bypass passage 15 and does not pass the oxidation catalyst device 12. In addition, the supply amount controller 30a adjusts the amount Lc of supplied ammonia-based solution which is supplied to the selective reduction type NOx catalyst device 14. Furthermore, a measured value or an estimated value of the catalytic temperature Tca of the oxidation catalyst device 12 and a measured value or an estimated value of a catalytic temperature Tcc of the selective reduction type NOx catalyst device 14 are inputted into this supply amount controller 30a depending on the necessity.

Figure 3:
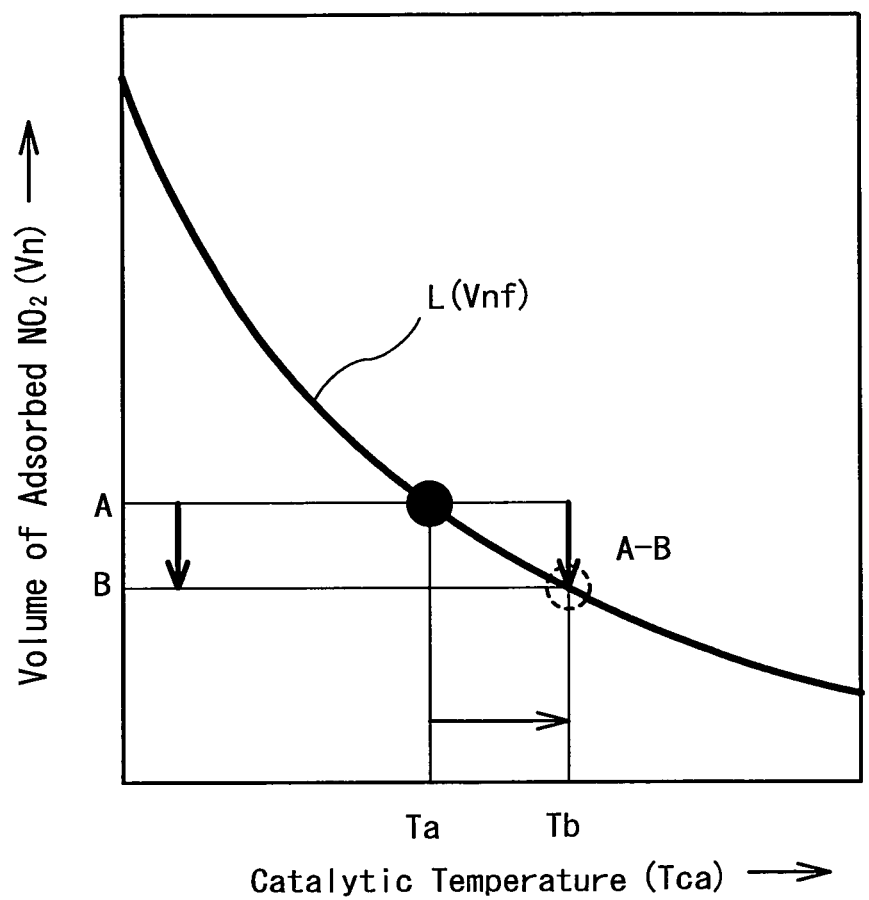
FIG. 3 is a diagram showing a relationship between a catalytic temperature and a saturation volume of adsorbed $NO_2$ in an oxidation catalyst device.

In this NOx purification system 1, part of NOx in the exhaust gas Gt discharged from the engine 10 is adsorbed to the oxidation catalyst device 12 until a volume of adsorbed $NO_2$ reaches a saturation volume Vnf of adsorbed $NO_2$ which is dependent on the catalytic temperature Tca. The remaining part of NOx having passed the oxidation catalyst device 12 is reduced by the selective reduction type NOx catalyst device 14. In addition, as shown in FIG. 3, as the catalytic temperature Tca becomes higher, the saturation volume Vnf of adsorbed $NO_2$ becomes smaller. For this reason, NOx having passed the oxidation catalyst device 12 and NOx released from the oxidation catalyst device 12 are reduced by the selective reduction type NOx catalyst device 14. This selective reduction type NOx catalyst device 14 reduces NOx to $N_2$ (nitrogen) by using $NH_3$ (ammonia), which is produced from the ammonia-based solution added to the exhaust gas Gc from the injection valve 13a, as the reducing agent. This exhaust gas Gc is thus purified, then passes the exhaust gas passage 11, and is discharged to the atmosphere.

Next, descriptions will be provided for how to control the adjustment of the exhaust gas flow rate and the adjustment of the amount of supplied ammonia-based solution in the NOx purification system 1. In this NOx purification system 1, the ammonia-based solution supply unit 13 controls the exhaust gas flow rates Vga, Vgb and the amount Lc of supplied ammonia-based solution in accordance with a control flow illustrated in FIG. 2 in the following manner.

Figure 2:
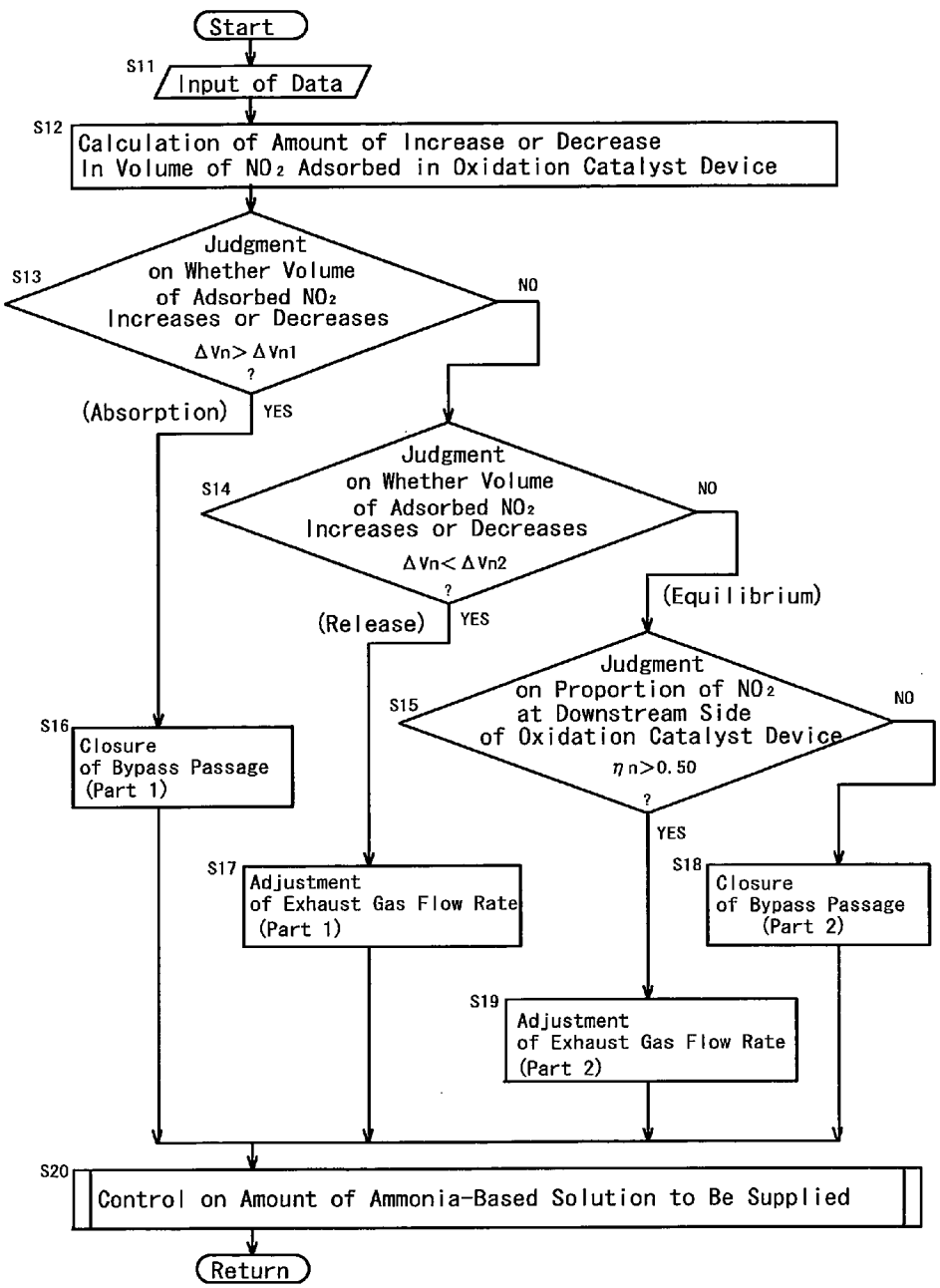
FIG. 2 is a diagram showing an instance of a control flow for a method of controlling the NOx purification system according to the embodiment of the present invention.

The control flow shown in FIG. 2 is shown as that: which is repeatedly called from a control flow for controlling the operation of the engine 10, and is thus executed for the NOx purification, once the engine 10 starts its operation; and whose execution is terminated together with the termination of the execution of the control flow for controlling the operation of the engine 10, once the engine 10 ends its operation.

This control flow shown in FIG. 2 is designed in the following manner. The increase and decrease in the volume Vn of $NO_2$ adsorbed in the oxidation catalyst device 12 is estimated from the volume Vn1 of NOx in the stage before the oxidation catalyst device 12 and a volume Vn2 of NOx in the stage after the oxidation catalyst device 12. On the basis of the increase and decrease in this estimated volume Vn of adsorbed $NO_2$, it is judged whether or not the volume Vn of $NO_2$ adsorbed in the oxidation catalyst device 12 reaches the saturation volume Vnf of adsorbed $NO_2$. Thus, the first exhaust gas flow rate Vga of the exhaust gas Ga passing the oxidation catalyst device 12 and the second exhaust gas flow rate Vgb of the exhaust gas Gb passing the bypass passage 15 are adjusted, while the amount Lc of supplied ammonia-based solution corresponding to an amount An of ammonia is adjusted and supplied with consideration being given to a proportion αc of $NO_2$ (or a ratio of NO to $NO_2$) in NOx in the exhaust gas Gc which flows into the selective reduction type NOx catalyst device 14 at this time. This enhances the capability of the selective reduction type NOx catalyst device 14 in the NOx purification, and optimizes the supply amount Lc.

Once this control flow shown in FIG. 2 is called, the control is started. In step S11, sets of data which are needed to adjust the exhaust gas flow rates Vga, Vgb are inputted. The sets of data include data on the engine, the NOx concentrations Cn1, Cn2, an oxygen concentration Co, the catalytic temperatures Tca, Tcc and the like.

This data on the engine includes the engine speed Ne, the quantity Q of injected fuel (load), a volume Va of intake air which indicate the operating condition of the engine 10, and which are detected by the engine operating condition detector 22. In addition, the NOx concentrations Cn1, Cn2 are respectively the first NOx concentration Cn1 detected by the first NOx concentration sensor 19, and the second NOx concentration Cn2 detected by the second NOx concentration sensor 20. Note that, in a case where the volume of discharged NOx is calculated from the operating condition of the engine by not using the NOx concentration Cn1 at the upstream side of the oxidation catalyst device 12, the map data on the volume of discharged NOx and the NOx concentration Cn2 at the downstream side of the oxidation catalyst device 12 are inputted.

The oxygen concentration Co is that which is detected by the oxygen concentration sensor 21. In addition, the catalytic temperature Tca is a temperature of an oxidation catalyst in the oxidation catalyst device 12. A directly-measured temperature of the catalyst may be used as the catalytic temperature Tca. However, it is difficult to measure the catalytic temperature Tca directly, and therefore a temperature estimated from the temperature of the exhaust gas which is detected by the first exhaust gas temperature sensor 16 is used as the catalytic temperature Tca. The catalytic temperature Tcc is a temperature of a selective reduction-type NOx catalyst (SCR catalyst) in the selective reduction type NOx catalyst device 14. A directly-measured temperature of the catalyst may be used as the catalytic temperature Tcc. Because, however, it is difficult to measure the catalytic temperature Tcc directly, a temperature estimated from the temperature of the exhaust gas which is detected by the third exhaust gas temperature sensor 18 is used as the catalytic temperature Tcc.

In step S12, an amount ΔVn of increase or decrease in the volume Vn of $NO_2$ adsorbed in the oxidation catalyst device 12 is calculated. This calculation of the amount ΔVn of increase or decrease in the volume Vn of adsorbed $NO_2$ therein is achieved as follows.

An exhaust gas flow rate Vgt is calculated from the volume Va of intake air detected by an air mass flow sensor, which is not illustrated, and the quantity Q of injected fuel. The first exhaust gas flow rate Vga of the exhaust gas Ga which passes the oxidation catalyst device 12 is found from valve lifts of the first and second flow-rate control valves 11a, 15a at the time when they are controlled, by referring to a beforehand found relationship among the valve lifts of the first and second flow-rate control valves 11a, 15a, the exhaust gas flow rate Vgt, and the first exhaust gas flow rate Vga.

The volume Vn1 of NOx at the upstream side of the oxidation catalyst device 12 is calculated from this first exhaust gas flow rate Vga and the first NOx concentration Cn1. The volume Vn2 of NOx at the downstream side of the oxidation catalyst device 12 is calculated from the first exhaust gas flow rate Vga and the second NOx concentration Cn2. The amount ΔVn of increase or decrease in the volume Vn of adsorbed $NO_2$ is calculated by subtracting the volume Vn2 of NOx at the downstream side thereof from the volume Vn1 of NOx at the upstream side thereof (ΔVn=Vn1−Vn2).

In step S13, which comes next, it is judged whether this volume Vn of adsorbed $NO_2$ increases or decreases. In other words, it is judged whether or not the amount ΔVn of increase or decrease in this volume Vn of adsorbed $NO_2$ is larger than a predetermined first judgment value ΔVn1. This predetermined first judgment value ΔVn1 may be zero (ΔVn1=0). For the purpose of preventing the hunting of the control, however, it is desirable that the predetermined first judgment value ΔVn1 should be a "+: plus" value close to zero (ΔVn1>0). Note that the judgment may be achieved by judging whether or not a value ΔCn (=Cn1−Cn2) obtained by simply subtracting the second NOx concentration Cn2 from the first NOx concentration Cn1 is larger than a predetermined first judgment concentration ΔCn1 (ΔCn1>0).

If the amount ΔVn of increase or decrease in the volume Vn of adsorbed $NO_2$ is larger than the predetermined first judgment value ΔVn1 in the judgment in step S13, that is to say, if ΔVn>ΔVn1 (or ΔCn>ΔCn1) (if Yes), it is judged that the volume Vn of adsorbed $NO_2$ increases. This state indicates that the volume Vn of adsorbed $NO_2$ has not reached the saturation volume Vnf of adsorbed $NO_2$ yet. Accordingly, the control flow proceeds to step S16 for the purpose of making control for the adsorption.

The control for closing the bypass passage (part 1) in step S16 sets the second exhaust gas flow rate Vgb of the exhaust gas Gb passing the bypass passage 15 to zero. To put it specifically, the first flow-rate control valve 11a is opened fully, and the second flow-rate control valve 15a is closed completely. Thereby, NO in the exhaust gas Gt is converted to $NO_2$ through oxidation of NO to $NO_2$ by the oxidation catalyst device 12, and the $NO_2$ thus produced is adsorbed in the oxidation catalyst device 12. Concurrently, the amount An of ammonia needed for the selective reduction type NOx catalyst device 14 is calculated. Subsequently, the control flow proceeds to step S20.

Next, descriptions will be provided for how to calculate this amount An of ammonia. When this control in step S16 is carried out, almost of NOx at the downstream side of the oxidation catalyst device 12 is NO, because $NO_2$ is adsorbed to the oxidation catalyst device 12. In addition, a volume Vnc of NOx in the exhaust gas Gc which flows into the selective reduction type NOx catalyst device 14 becomes equal to the volume Vn2 of NOx in the exhaust gas Ga having passed the oxidation catalyst device 12 (Vnc=Vn2).

Figure 7:
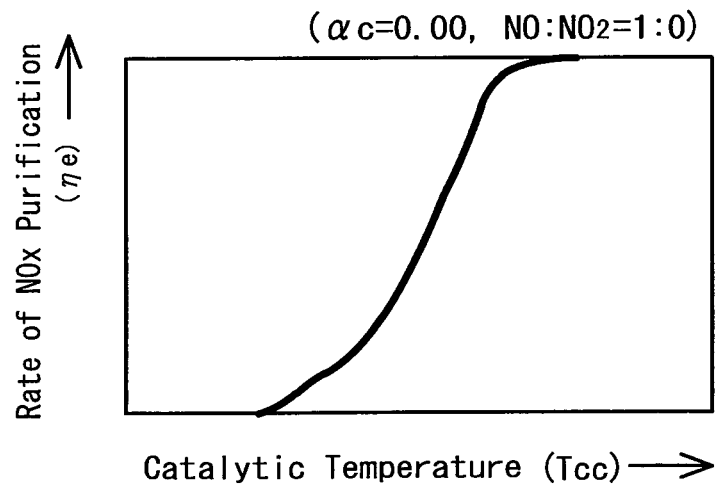
FIG. 7 is a diagram showing the catalytic temperature and the rate of NOx purification in the selective reduction type NOx catalyst device in a case where the proportion of $NO_2$ in NOx is 0% (or NO:$NO_2$=1:0).

Accordingly, almost of NOx in the exhaust gas Gc which flows into the selective reduction type NOx catalyst device 14 is NO under this condition. Hence, an amount An1 of ammonia is calculated on the basis of the volume Vnc of NOx and a reaction represented by Reaction Formula (2) "$4NH_3 + 4NO + O_2 \rightarrow 4N_2 + 6H_2O$," which requires only NO. The necessary amount An of ammonia is calculated through correction by multiplying this calculated amount An1 of ammonia by a rate ηe of NOx purification at the corresponding catalytic temperature Tcc with reference to a relationship between the catalytic temperature Tcc and the rate ηe of NOx purification in the selective reduction type NOx catalyst device 14 in a case where the proportion αc of $NO_2$ is zero (a ratio of NO to $NO_2$ is 1:0) as shown in FIG. 7 (An=An1×ηe).

If ΔVn>ΔVn1 is not satisfied in the judgment in step S13 (if NO), the control flow proceeds to step S14. In step S14, which comes next, it is judged whether or not the amount ΔVn of increase or decrease in the volume Vn of adsorbed $NO_2$ is smaller than a predetermined second judgment value ΔVn2. This predetermined second judgment value ΔVn2 may be zero ($\Delta Vn2=0$). For the purpose of preventing the hunting of the control, however, it is desirable that the predetermined second judgment value $\Delta Vn2$ should be a "−: minus" value close to zero ($\Delta Vn2<0$, for instance, $\Delta Vn2=-\Delta Vn1$). Note that this judgment may be achieved by judging whether or not the value $\Delta Cn$ (=$Cn1-Cn2$) obtained by simply subtracting the second NOx concentration $Cn2$ from the first NOx concentration $Cn1$ is smaller than a predetermined second judgment concentration $\Delta Cn2$ ($\Delta Cn2<0$).

If the amount $\Delta Vn$ of increase or decrease in the volume $Vn$ of adsorbed $NO_2$ is smaller than the predetermined second judgment value $\Delta Vn2$, that is to say, if $\Delta Vn<\Delta Vn2$ (or $\Delta Cn<\Delta Cn2$) (if Yes), it is judged that the volume $Vn$ of adsorbed $NO_2$ decreases. This state indicates that $NO_2$ is released because the volume $Vn$ of adsorbed $NO_2$ reaches the saturation volume $Vnf$ of adsorbed $NO_2$. Subsequently, the control flow proceeds to step S17 for the purpose of making control for $NO_2$ discharge.

As shown in FIG. 3, $NO_2$ adsorbed to the oxidation catalyst device 12 is released when the saturated volume $Vnf$ of adsorbed $NO_2$ decreases due to the rise of the catalytic temperature $Tca$ of the oxidation catalyst and thus the saturation volume $Vnf$ of adsorbed $NO_2$ becomes lower than the volume $Vn$ of adsorbed $NO_2$. For instance, as the catalytic temperature $Tca$ rises from $Ta$ to $Tb$, the saturation volume $Vnf$ of adsorbed $NO_2$ decreases from A to B. As a result, a volume A-B of $NO_2$ is released.

The adjustment (part 1) of the exhaust gas flow rate for this $NO_2$ discharge in step S17 is achieved by: making the part Ga of the exhaust gas Gt flow to the oxide catalyst device 12; and making the remaining part Gb of the exhaust gas Gt flow to the bypass passage 15. In other words, both of the first flow-rate control valve 11a and the second flow-rate control valve 15a are opened, and the exhaust gas flow rates Vga, Vgb are thereby adjusted.

In this respect, control is made to adjust the first exhaust gas flow rate Vga of the exhaust gas Ga to be allowed to pass the oxidation catalyst device 12 and the second exhaust gas flow rate Vgb of the exhaust gas Gb to be allowed to pass the bypass passage 15 in order that the proportion $\alpha c$ of $NO_2$ which flows into the selective reduction type NOx catalyst device 14 can become equal or closer to 50%, that is to say, the ratio of NO to $NO_2$ can become equal or closer to 1:1. This control is achieved as follows.

For the control for this flow rate adjustment (part 1) in step S 17, the first exhaust gas flow rate Vga of the exhaust gas Ga passing the oxidation catalyst device 12, and a proportion $\alpha 1$ of $NO_2$ in the exhaust gas Ga discharged from the oxidation catalyst device 12 are calculated. This first exhaust gas flow rate Vga is found from valve lifts of the first and second flow-rate control valves 11a, 15a at the time when they are controlled, by referring to the beforehand found relationship among the valve lifts of the first and second flow-rate control valves 11a, 15a, the exhaust gas flow rate Vgt, and the first exhaust gas flow rate Vga.

Figure 4:
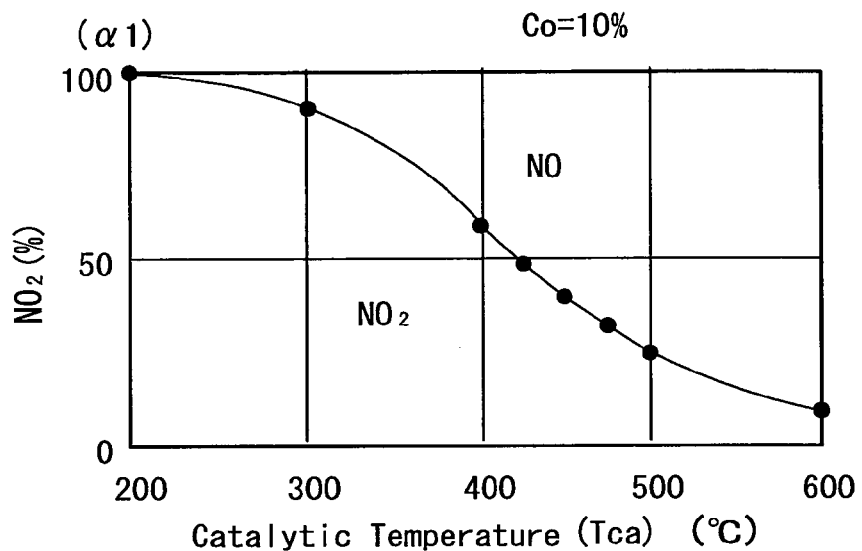
FIG. 4 is a diagram showing a relationship between a catalytic temperature in the oxidation catalyst device and an equilibrium composition determining a proportion of $NO_2$ in NOx (or a ratio of NO to $NO_2$) in a case where an oxygen concentration is 10%.
Figure 5:
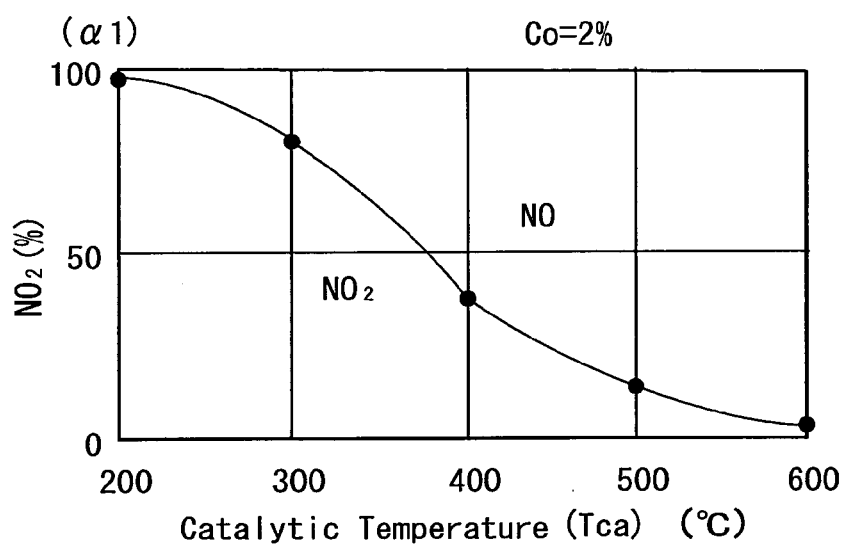
FIG. 5 is a diagram showing a relationship between a catalytic temperature in the oxidation catalyst device and an equilibrium composition determining a proportion of $NO_2$ in NOx (or the ratio of NO to $NO_2$) in a case where an oxygen concentration is 2%.

This proportion $\alpha 1$ of $NO_2$ is estimated from the catalytic temperature Tca of the oxidation catalyst device 12 and the oxygen concentration Co of the exhaust gas Ga (equivalent to the concentration Co of oxygen in the exhaust Gt), according to an equilibrium composition between NO and $NO_2$ which is determined by the catalytic temperature Tca and the oxygen concentration Co, by referring to a corresponding set of data on the equilibrium composition between NO and $NO_2$ (an equilibrium ratio of NO to $NO_2$). The set of data on the equilibrium composition between NO and $NO_2$ includes those as illustrated by FIGS. 4 and 5, for instance. In FIGS. 4 and 5, the horizontal axis indicates the catalytic temperature Tca, and the vertical axis indicates the proportion $\alpha 1$ of $NO_2$. The line indicates the equilibrium composition between NO and $NO_2$. FIG. 4 shows the equilibrium composition in a case where the oxygen concentration Co is 10%. FIG. 5 shows the equilibrium composition in a case where the oxygen concentration Co is 2%. Accordingly, for instance, in the case where the concentration Co of oxygen in the exhaust gas G is 10%, FIG. 4 is referred to. If the catalytic temperature Tca is 400° C., the proportion $\alpha 1$ of $NO_2$ is approximately 60%. The proportion $\alpha 1$ of $NO_2$ in NOx contained in the exhaust gas Ga flowing out of the oxidation catalyst device 12 is estimated in this manner.

A volume $Vna1$ of NO (=$Vna\times(1-\alpha 1)$) and a volume $Vna2$ of $NO_2$ (=$Vna\times\alpha 1$) are calculated from this proportion $\alpha 1$ of $NO_2$ and a volume $Vna$ of NOx (=$Cn2\times Vga$) included in the first exhaust gas flow rate Vga of the exhaust gas Ga flowing out of the oxidation catalyst device 12.

On the other hand, the second exhaust gas flow rate Vgb of the exhaust gas Gb which passes the bypass passage 15 by bypassing the oxidation catalyst device 12 is found by subtracting the first exhaust gas flow rate Vga from the overall flow rate Vgt of the exhaust gas Gt (Vgb=Vgt−Vga). A volume Vnb of NOx in this exhaust gas Gb is calculated from the second exhaust gas flow rate Vgb and the first NOx concentration Cn1 (Vnb=Cn1×Vgb). In addition, a proportion $\alpha 2$ of $NO_2$ in this exhaust gas Gb (equivalent to the proportion of $NO_2$ in the exhaust gas Gt) is calculated from the engine speed Ne, the quantity Q of injected fuel (or load) and the like, which indicate the operating condition of the engine 10, by referring to map data on the proportion of $NO_2$. Thereby, a volume $Vnb1$ of NO (=$Vnb\times(1-\alpha 2)$) and a volume $Vnb2$ of $NO_2$ (=$Vnb\times\alpha 2$) are calculated from a relationship of the volume $Vnb1$ of NO and the volume $Vnb2$ of $NO_2$ with the volume Vnb of NOx included in the second gas flow rate Vgb.

On the basis of these calculation results, a volume $Vnc1$ of NO in the exhaust gas flowing into the selective reduction type NOx catalyst device 14 is calculated by adding the volume $Vna1$ of NO and the volume $Vnb1$ of NO ($Vnc1=Vna1+Vnb1$), and a volume $Vnc2$ of $NO_2$ in the exhaust gas flowing into the selective reduction type NOx catalyst device 14 is calculated by adding the volume $Vna2$ of $NO_2$ and the volume $Vnb2$ of $NO_2$ ($Vnc2=Vna2+Vnb2$). Thereby, the proportion $\alpha c$ of the volume of $NO_2$ in the volume of NOx (or the ratio of the volume of NO to the volume of $NO_2$) is calculated ($\alpha c=Vnc2/(Vnc1+Vnc2)$).

On the basis of these sets of information, control is made in order that the first exhaust gas flow rate Vga can increase or decrease in a way that the proportion $\alpha c$ of the volume Vnc of $NO_2$ in the volume of NOx becomes equal to 50%. Thereby, the proportion $\alpha c$ of the volume of $NO_2$ in the volume of NOx is made equal or closer to 50% (the ratio of the volume of NO to the volume of $NO_2$ is made equal or closer to 1:1).

Figure 6:
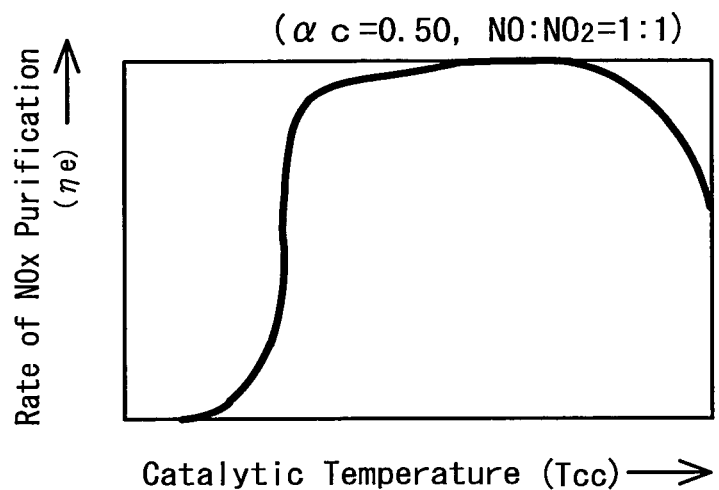
FIG. 6 is a diagram showing a catalytic temperature and a rate of NOx purification in a selective reduction type NOx catalyst device in a case where the proportion of $NO_2$ in NOx is 50% (or NO:$NO_2$=1:1).

If the proportion $\alpha c$ of NO2 becomes equal to 50%, that is to say, the ratio of NO to NO2 becomes equal to 1:1, through the adjustment of these exhaust gas flow rates Vga, Vgb, the amount An1 of ammonia is then calculated on the basis of the volume Vnc of NOx and a reaction represented by Reaction Formula (3) "$2NH3+NO+NO2 \rightarrow 2N2+3H20$." The necessary amount An of ammonia is calculated through correction by multiplying this calculated amount An1 of ammonia by a rate $\eta e$ of NOx purification at the corresponding catalytic temperature Tcc with reference being made to a relationship between the catalytic temperature Tcc and the rate $\eta e$ of NOx purification in the selective reduction type NOx catalyst device 14 which are related to each other in a case where the proportion ac of NO2 is 50% (the ratio of NO to NO2 is 1:1) as shown in FIG. 6 ($An=An1\times \eta e$).

If the proportion αc of $NO_2$ still remains at a value smaller than 50% even at its maximum regardless of the control of the exhaust gas flow rates Vga, Vgb, the proportion αc of $NO_2$ has not become equal to 50% yet, that is to say, the ratio of NO to $NO_2$ has not become equal to 1:1 yet. At this time, out of the amount An of ammonia, an amount Ana of ammonia for the volume Vnc2 of $NO_2$ is calculated on the basis of the reaction represented by Reaction Formula (3) "$2NH_3+NO+NO_2 \rightarrow 2N_2+3H_2O$" and the rate ηe of NOx purification shown in FIG. 6. In addition, out of the amount An of ammonia, an amount Anb of ammonia for the volume (Vnc1−Vnc2) of NO which remains unreacted despite this reaction is calculated on the basis of a reaction represented by Reaction Formula (2) "$4NH_3+4NO+O_2 \rightarrow 4N_2+6H_2O$" and the rate ηe of NOx purification shown in FIG. 7. The necessary amount An of ammonia (=Ana+Anb) is calculated by adding the amount Ana of ammonia and the amount Anb of ammonia.

Furthermore, if the proportion αc of $NO_2$ still remains at a value larger than 50% even at its minimum regardless of the control of the exhaust gas flow rates Vga, Vgb, the proportion αc of $NO_2$ has not become equal to 50% yet, that is to say, the ratio of NO to $NO_2$ has not become equal to 1:1 yet. At this time, out of the amount An of ammonia, an amount Ana of ammonia for the volume Vnc1 of NO is calculated on the basis of the reaction represented by Reaction Formula (3) "$2NH_3+NO+NO_2 \rightarrow 2N_2+3H_2O$" and the rate ηe of NOx purification shown in FIG. 6. In addition, out of the amount An of ammonia, an amount Anc of ammonia for the volume (Vnc2−Vnc1) of $NO_2$ which remains unreacted despite this reaction is calculated on the basis of a reaction represented by Reaction Formula (4) "$8NH_3+6NO_2 \rightarrow 7N_2+12H_2O$" and a rate ηe of NOx purification which corresponds to a case where the proportion αc of $NO_2$ is 100% (the ratio NO to $NO_2$ is 0:1), and which is not illustrated but corresponds to FIG. 6 or FIG. 7. Accordingly, the necessary amount An of ammonia (=Ana+Anc) is calculated by adding the amount Ana of ammonia and the amount Anc of ammonia.

In addition, if ΔVn<ΔVn2 is not satisfied (if NO) in the judgment in step S14, it is judged that no $NO_2$ is adsorbed to or released from the oxidation catalyst device 12, and the control flow proceeds to step S15 for the purpose of an operation for the equilibrium.

In step S15, it is judged whether a proportion (molar ratio) α3 of $NO_2$ to NOx in the exhaust gas Ga flowing out of the oxidation catalyst device 12 is not higher than 50%. In other words, it is judged whether or not the ratio of NO to $NO_2$ in the exhaust gas is higher than 1:1.

For this judgment in step S15, the volume Vna1 of NO and the volume Vna2 of $NO_2$ in the exhaust gas Ga flowing out of the oxidation catalyst device 12 are calculated. To this end, first of all, the first exhaust gas flow rate Vga of the exhaust gas Ga passing the oxidation catalyst device 12 is calculated. This first exhaust gas flow rate Vga is found from valve lifts of the respective first and second flow-rate control valves 11a, 15a at the time when they are controlled, by referring to the beforehand found relationship among the valve lifts of the first and second flow-rate control valves 11a, 15a, the exhaust gas flow rate Vgt, and the first exhaust gas flow rate Vga.

Subsequently, the proportion α2 of $NO_2$ to NOx (or the ratio of NO to $NO_2$) in the exhaust gas Ga flowing into the oxidation catalyst device 12 is calculated from the engine speed N2, the quantity Q of injected fuel and the like, which indicate the operating condition of the engine 10, by referring to the map data on the proportion of $NO_2$. Note that this map data on the proportion of $NO_2$ is beforehand set up through an experiment and the like, and is stored in the control unit 30.

A volume Vnai of NOx flowing into the oxidation catalyst device 12 is calculated from a volume Vnt of NOx discharged from the engine 10 and the flow rate Vga of the exhaust gas Ga flowing into the oxidation catalyst device 12 (Vnai=Vnt× Vga/Vgt). A volume Vnai1 of NO and a volume Vnai2 of $NO_2$, which flow into the oxidation catalyst device 12, are calculated from this volume Vnai of NOx and the proportion α2 of $NO_2$ (Vnai1=Vnai×(1−α2), Vnai2=Vnai×α2).

Subsequently, the volume Vna1 of NO having passed the oxidation catalyst device 12 is calculated. A volume Vna3 of NO to be converted to $NO_2$ by the oxidation catalyst device 12 is calculated from the catalytic temperature Tca by referring to conversion rate map data which indicates a relationship between the catalytic temperature Tca and a rate βa of NO to be converted (oxidized) to $NO_2$. The relationship concerning this conversion rate βa is beforehand set up through an experiment and the like, and is stored in the supply amount controller 30a. In short, the volume Vna3 of NO to be consumed through the oxidation of NO in this oxidation catalyst device 12 is calculated as a value found by multiplying the volume Vnai1 of NO flowing into the oxidation catalyst device 12 by the conversion rate βa (Vna3=Vnai1×βa). In addition, the volume Vna1 of NO flowing out to the downstream side of the oxidation catalyst device 12 without changing is calculated as a value obtained by subtracting the volume Vna3 of NO consumed through the conversion from the volume Vnai1 of NO flowing into the oxidation catalyst device 12 (Vna1=Vnai1×(1βa)).

Subsequently, the volume Vna2 of $NO_2$ having passed the oxidation catalyst device 12 is calculated. A volume Vna4 of $NO_2$ produced through the conversion of NO to $NO_2$ by the oxidation catalyst device 12 is calculated as a value found by multiplying the volume Vnai1 of NO flowing into the oxidation catalyst device 12 by the conversion rate βa (Vna4=Vna3=Vnai1×βa). In addition, a volume Vna5 of $NO_2$ released from the oxidation catalyst device 12 is calculated from the amount ΔVn of increase in volume of NOx. In other words, the amount ΔVn of increase in volume of NOx is regard as this volume Vna5 of released $NO_2$ (Vna5=ΔVn). Accordingly, the volume Vna2 of $NO_2$ in the exhaust gas Ga having passed the oxidation catalyst device 12 is equal to the sum of the volume Vnai2 of $NO_2$ flowing into the oxidation catalyst device 12, the volume Vna4 of $NO_2$ converted from the NO, and the volume Vna5 of released $NO_2$ (Vna2=Vnai2+ Vna4+Vna5).

As a result of these, the proportion α3 of the volume of $NO_2$ to the volume of NOx, which has passed the oxidation catalyst device 12, can be calculated from the volume Vna1 of NO and the volume Vna2 of $NO_2$, which have passed the oxidation catalyst device 12 (α3=Vna2/(Vna1+Vna2)).

If it is judged that the proportion (molar ratio) α3 of $NO_2$ in NOx is not higher than 50%, that is to say, the ratio of NO to $NO_2$ in the exhaust gas is higher than 1:1 ($NO/NO_2>1$) (if NO) in step S15, the control flow proceeds to step S18. The control for closing the bypass passage (part 2) in step S18 is achieved by: making all of the volume Vgt of the exhaust gas Gt flow to the oxidation catalyst device 12; and setting the flow rate Vgb of the exhaust gas Gb passing the bypass passage 15 to zero. In other words, the first flow-rate control valve 11a is opened fully, and the second flow-rate control valve 15a is closed completely.

At this time, the proportion αc of $NO_2$ to NOx in the exhaust gas Gc flowing into the selective reduction type NOx catalyst device 14 remains equal to or lower than 50%. For this reason, the amount Ana of ammonia for the corresponding volume Vna2 of $NO_2$ is calculated on the basis of the reaction represented by Reaction Formula (3) "$2NH_3+NO+$ $NO_2 \rightarrow 2N_2+3H_2O$" and the rate $\eta e$ of NOx purification. In addition, the amount Anb of ammonia for the volume (Vna1−Vna2) of NO which remains unreacted despite this reaction is calculated on the basis of the reaction represented by Reaction Formula (2) "$4NH_3+4NO+O_2 \rightarrow 4N_2+6H_2O$" and the rate $\eta e$ of NOx purification shown in FIG. 7. Accordingly, the necessary amount An of ammonia (=Ana+Anb) is calculated by adding the amount Ana of ammonia and the amount Anb of ammonia.

Furthermore, if it is judged that the proportion $\alpha 3$ of $NO_2$ in NOx is higher than 50% (if YES) in step S15, the control flow proceeds to step S19 for the adjustment (part 2) of the exhaust gas flow rate.

The adjustment (part 2) of the exhaust gas flow rate for the equilibrium in step S19 is achieved by making the part Ga of the exhaust gas Gt flow to the oxidation catalyst device 12; and making the remaining part Gb of the exhaust gas Gt flow to the bypass passage 15. In other words, both the first flow-rate control valve 11a and the second flow-rate control valve 15a are opened, and the flow rates Vga, Vgb of the respective exhaust gases Ga, Gb are thus adjusted.

At this time, control is made to adjust the flow rate Vga of the exhaust gas Ga to be allowed to pass the oxidation catalyst device 12 and the flow rate Vgb of the exhaust gas Gb to be allowed to pass the bypass passage 15 in order that the proportion ac of $NO_2$ which flows into the selective reduction type NOx catalyst device 14 can become equal or closer to 50%, that is to say, the ratio of NO to $NO_2$ can become equal or closer to 1:1. This control is achieved as follows.

For the control for this flow rate adjustment (part 2) in step S19, the first exhaust gas flow rate Vga of the exhaust gas Ga passing the oxidation catalyst device 12, and the proportion $\alpha 1$ of $NO_2$ in the exhaust gas Ga discharged from the oxidation catalyst device 12 are calculated. This first exhaust gas flow rate Vga is found from valve lifts of the first and second flow-rate control valves 11a, 15a at the time when they are controlled, by referring to the beforehand found relationship among the valve lifts of the first and second flow-rate control valves 11a, 15a, the exhaust gas flow rate Vgt, and the first exhaust gas flow rate Vga.

Subsequently, the volume Vna1 of NO and the volume Vna2 of $NO_2$ in the exhaust gas flowing out of the oxidation catalyst device 12 are calculated in the same manner as the volume Vna1 of NO and the volume Vna2 of $NO_2$ in the exhaust gas flowing out of the oxidation catalyst device 12 are calculated in step S15.

Thereafter, the volume Vnb1 of NO and the volume Vnb2 of $NO_2$ in the exhaust gas Gb passing the bypass passage 15 are calculated. To this end, this flow rate Vgb of the exhaust gas Gb is calculated by subtracting the first exhaust gas flow rate Vga of the exhaust gas Ga passing the oxidation catalyst device 12 from the flow rate Vgt of the exhaust gas Gt (Vgb=Vgt−Vga).

In addition, the volume Vnb1 of NO and the volume Vnb2 of $NO_2$ are calculated from this exhaust gas flow rate Vgb, the NOx concentration Cn1, and the proportion $\alpha 2$ of $NO_2$ to NOx in the exhaust gas Gt discharged from the engine 10. The volume Vnb1 of NO is calculated by multiplying the second exhaust gas flow rate Vgb by the NOx concentration Cn1 and (1−$\alpha 2$) (Vnb1=Vgb×Cn1×(1−$\alpha 2$)). Furthermore, the volume Vnb2 of $NO_2$ is calculated by multiplying the second exhaust gas flow rate Vgb by the NOx concentration Cn1 and the proportion $\alpha 2$ of $NO_2$ (Vnb2=Vgb×Cn1×$\alpha 2$).

On the basis of these calculation results, the volume Vnc1 of NO in the exhaust gas flowing into the selective reduction type NOx catalyst device 14 is calculated by adding the volume Vna1 of NO and the volume Vnb1 of NO (Vnc1=Vna1+Vnb1), and the volume Vnc2 of $NO_2$ in the exhaust gas flowing into the selective reduction type NOx catalyst device 14 is calculated by adding the volume Vna2 of $NO_2$ and the volume Vnb2 of $NO_2$ (Vnc2=Vna2+Vnb2). Thereby, the proportion $\alpha c$ of the volume of $NO_2$ in NOx (or the ratio of the volume of NO to the volume of $NO_2$) is calculated ($\alpha c$=Vnc2/(Vnc1+Vnc2)).

On the basis of these sets of information, the first exhaust gas flow rate Vga is increased or decreased in a way that the proportion $\alpha c$ of the volume of $NO_2$ in NOx becomes equal to 50%, that is to say, the ratio of NO to $NO_2$ becomes equal to 1:1. Thereby, the proportion $\alpha c$ of the volume of $NO_2$ in NOx is made equal or closer to 50%, that is to say, the ratio of the volume of NO to the volume of $NO_2$ is made equal or closer to 1:1. In other words, on the basis of the result of calculation of this proportion $\alpha c$ of $NO_2$ in NOx (or the ratio of NO to $NO_2$), control is made to adjust the first exhaust gas flow rate Vga and the second exhaust gas flow rate Vgb in order that the proportion $\alpha c$ of $NO_2$ flowing into the selective reduction type NOx catalyst device 14 can become equal to 50%, that is to say, the ratio of NO to $NO_2$ becomes equal to 1:1.

At this time, if the proportion $\alpha c$ of $NO_2$ becomes equal to 50%, that is to say, the ratio of NO to $NO_2$ becomes equal to 1:1, the amount An1 of ammonia is calculated from the volume of NOx (Vnc1+Vnc2) on the basis of the reaction represented by Reaction Formula (3) "$2NH_3+NO+NO_2 \rightarrow 2N_2+3H_2O$." The necessary amount An of ammonia (=An1×$\eta e$) is calculated through correction by multiplying this calculated amount An1 of ammonia by the rate $\eta e$ of NOx purification at the corresponding catalytic temperature Tcc with reference to the relationship between the catalytic temperature Tcc and the rate $\eta e$ of NOx purification in the selective reduction type NOx catalyst device 14 in a case where the proportion $\alpha c$ of $NO_2$ is 50% (the ratio of NO to $NO_2$ is 1:1) as shown in FIG. 6.

If the proportion $\alpha c$ of $NO_2$ has not become equal to 50% yet, that is to say, if the ratio of NO to $NO_2$ has not become equal to 1:1 yet, in other words, if the proportion $\alpha c$ of $NO_2$ still remains at a value larger than 50% regardless of the control of the exhaust gas flow rates Vga, Vgb, the amount Ana of ammonia for the volume Vnc1 of NO is calculated out of the amount of ammonia at this time. The calculation of this amount Ana of ammonia is achieved on the basis of the reaction represented by Reaction Formula (3) "$2NH_3+NO+NO_2 \rightarrow 2N_2+3H_2O$" and the rate $\eta e$ of NOx purification shown in FIG. 6. Out of the amount of ammonia at this time, the amount Anc of ammonia for the volume (Vnc2−Vnc1) of $NO_2$ which remains unreacted despite this reaction is calculated on the basis of the reaction represented by Reaction Formula (4) "$8NH_3+6NO_2 \rightarrow 7N_2+12H_2O$" and the rate $\eta e$ of NOx purification which corresponds to a case where the proportion of $NO_2$ is 100% (the ratio of NO to $NO_2$ is 0:1), and which is not illustrated but corresponds to FIG. 6 or FIG. 7. Accordingly, the necessary amount An of ammonia (=Ana+Anc) is calculated by adding the amount Ana of ammonia and the amount Anc of ammonia.

The amount of ammonia-based solution to be supplied is controlled in step S20 after any one of steps S16 to S19. This control is achieved by supplying the ammonia-based solution from the injection valve 13a to the exhaust gas passage 11 in a way that the amount of ammonia-based solution is sufficient to produce the necessary amount An of ammonia which is calculated in steps S16 to S19.

In addition, the control of the exhaust gas flow rate in any one of steps S16 to S19 and the subsequent control of the amount of supplied ammonia-based solution in step 20 are carried out for a predetermined length of time (a length of time related to an interval of time for which judgment is made on whether the volume of adsorbed $NO_2$ increases or decreases and an interval of time for which judgment is made on the proportion of $NO_2$). Thereafter, the control flow returns. Once the control flow returns, steps from step S11 to step S20, which are called by the upper-level control flow, are repeated.

Once the operation of the engine 10 is terminated, the control flow shown in FIG. 2 is no longer called by the upper-level control flow. Thus, the control flow shown in FIG. 2 is terminated in conjunction with the termination of the upper-level control flow. Note that, if the operation of the engine 10 is terminated in the middle of execution of the control flow shown in FIG. 2, an interrupt occurs, and thus the control flow shown in FIG. 2 is suspended. The process then returns to the upper-level control flow, and the control flow shown in FIG. 2 is terminated in conjunction with the termination of the upper-level control flow.

The control flow shown in FIG. 2 makes the proportion ac of the volume of $NO_2$ in NOx in the exhaust gas Gc flowing into the selective reduction type NOx catalyst device 14 equal or closer to 50% (the ratio of the volume of NO to the volume of $NO_2$ equal or closer to 1:1), and is accordingly capable of enhancing the capability to purify NOx. The reason for this is as follows.

FIG. 6 shows the relationship between the catalytic temperature and the rate of NOx purification which is observed in the case where the proportion of $NO_2$ in NOx is 50% (the ratio of NO to $NO_2$ is 1:1). FIG. 7 shows the relationship between the catalytic temperature and the rate of NOx purification which is observed in the case where the proportion of $NO_2$ in NOx is 0% (the ratio of NO to $NO_2$ is 1:0). As clear from FIGS. 6 and 7, the capability to purify NOx in the lower temperature range is remarkably high in the case where the proportion of $NO_2$ in NOx is 50% (the ratio of NO to $NO_2$ is 1:1). For this reason, the rate of NOx purification can be increased by making control in order that the proportion of the volume of $NO_2$ in NOx can become closer to 50% (the ratio of NO to $NO_2$ can become closer to 1:1) as much as possible.

In addition, the method of controlling a NOx purification system causes $NO_2$, which is produced by the oxidation catalyst device 12, to be adsorbed to the oxidation catalyst device 12, and accordingly causes NO to constitute almost all of NOx which flows into the selective reduction type NOx catalyst device 14, in the case where the volume of $NO_2$ adsorbed in the oxidation catalyst device 12 is still small and does not reach saturation. Corresponding to this, the method is capable of: calculating the amount of ammonia-based solution to be supplied on the basis of the reaction represented by Reaction Formula (2) "$4NH_3+4NO+O_2 \rightarrow 4N_2+6H_2O$" which indicates the reaction of NO in the NOx purification; correcting the calculated amount of ammonia-based solution to be supplied on the basis of the map about the NOx purification rate of the selective reduction type NOx catalyst; and thereby adding the necessary amount Lc of ammonia-based solution.

Furthermore, NOx is flowed out of the oxidation catalyst device 12 with the ratio of NO to $NO_2$ corresponding to the rate βa of NO to be converted to $NO_2$ (the rate of $NO_2$ production) which can be estimated from the exhaust gas flow rate Vga, the catalytic temperature Tca, the NOx concentration Cn1 and the oxygen concentration Co, in the case where the volume of adsorbed $NO_2$ becomes closer to saturation in the oxidation catalyst device 12. In this respect, if $NO_2$ is expected to become larger than NO, the method adjusts the first exhaust gas flow rate Vga of the exhaust gas Ga to be allowed to pass the oxidation catalyst device 12 and the second exhaust gas flow rate Vgb of the exhaust gas Gb to be allowed not to pass the oxidation catalyst device 12, and accordingly makes the ratio of NO to $NO_2$ flowing into the selective reduction type NOx catalyst device 14 equal to 1:1. Corresponding to this, the method is capable of: calculating the amount Lc of ammonia-based solution to be supplied on the basis of the reaction represented by Reaction Formula (3) "$2NH_3+NO+NO_2 \rightarrow 2N_2+3H_2O$" which indicates the NOx purification; correcting the calculated amount of ammonia-based solution to be supplied on the basis of the map about the NOx purification rate of the selective reduction type NOx catalyst; and thereby adding the necessary amount of ammonia-based solution.

Moreover, the method estimates the volume Vna5 of released NOx on the basis of a degree of rise in the catalytic temperature Tca of the oxidation catalyst, in the case where: the volume of adsorbed $NO_2$ in the oxidation catalyst device 12 reaches saturation; and it is judged that part of adsorbed $NO_2$ is released as a result of decrease in the saturation amount Vnf of adsorbed $NO_2$ which occurs due to the rise in the temperature. In addition, the method finds the volume Vn1 of NOx discharged from the engine 10 and the rate βa of NO to be converted to $NO_2$ on the basis of the current condition of the exhaust gas, and estimates the volume of $NO_2$ including the released $NO_2$. Thus, the method adjusts the first exhaust gas flow rate Vga of the exhaust gas Ga allowed to pass the oxidation catalyst device 12 and the second exhaust gas flow rate Vgb of the exhaust gas Gb not allowed to pass the oxidation catalyst device 12 in order that the proportion αc of $NO_2$ in NOx flowing into the selective reduction type NOx catalyst device 14 can become equal or closer to 50% (or the ratio of NO to $NO_2$ can become equal or closer to 1:1). Additionally, the method is capable of adding the amount Lc of ammonia-based solution corresponding to the volume Vnc of NOx to be purified in accordance with the current condition of the exhaust gas.

Accordingly, the method of controlling a NOx purification system and the NOx purification system are capable of: estimating the proportion ac of NO2 (or the ratio of NO to NO2) in NOx which flows into the selective reduction type NOx catalyst device 14 by giving consideration to a result of the judgment on whether or not the adsorption of NO2 in the oxidation catalyst device 12 reaches saturation; more faithfully reflecting the purification capability of the selective reduction type NOx catalyst corresponding to the difference between the components of NOx; optimizing the necessary amount of ammonia-based solution to be supplied; and thus preventing the problems which occur due to shortage and excessive supply of ammonia.

The method of controlling a NOx purification system and the NOx purification system according to the present invention, which have the foregoing excellent advantages, are capable of avoiding problems which occur due to shortage and excessive supply of ammonia by: estimating how much of $NO_2$ is adsorbed in the oxidation catalyst device; thus making the ratio of NO to $NO_2$ in NOx, which flows into the selective reduction type NOx catalyst device, closer to 1:1 as much as possible; and adding a necessary amount of ammonia-based solution. For this reason, the method and the system can be highly effectively used for the NOx purification system configured to reduce NOx contained in an exhaust gas by including the oxidation catalyst device and the selective reduction type NOx catalyst device, which are arranged in this order from the upstream side.

What is claimed is:

1. A NOx purification system configured to reduce NOx contained in an exhaust gas, the system including:
   an oxidation catalyst device, a first valve, and a selective reduction type NOx catalyst device which are arranged in order from an upstream side of an exhaust gas passage, the first valve to supply an ammonia-based solution to the exhaust gas passage;
   a bypass passage branching from the exhaust gas passage at an upstream side of the oxidation catalyst device and joining together with the exhaust gas passage at an upstream side of the first valve;
   at least one second valve to control a flow rate of the exhaust gas which flows through the bypass passage, and
   a controller configured to calculate volumes of NOx respectively in stages before and after the oxidation catalyst device,
   estimate whether a volume of $NO_2$ adsorbed in the oxidation catalyst device increases or decreases on a basis of the calculated volumes of NOx,
   control a flow rate of the exhaust gas which passes the oxidation catalyst device and a flow rate of the exhaust which passes the bypass passage on a basis of the increase or decrease in the estimated volume of adsorbed $NO_2$, and
   control an amount of the ammonia-based solution to be supplied by the first valve.

2. The NOx purification system according to claim 1, wherein:
   the controller is further configured to:
      perform control such that the flow rate of the exhaust gas which passes the bypass passage is set to zero, when the estimated volume of adsorbed $NO_2$ increases;
      perform control such that part of the exhaust gas is caused to pass the bypass passage and the remaining part of the exhaust gas is caused to pass the oxidation catalyst device, when the estimated volume of adsorbed $NO_2$ decreases;
      estimate a proportion (molar ratio) of $NO_2$ in NOx contained in the exhaust gas which flows out of the oxidation catalyst device, when the estimated volume of adsorbed NO.sub.2 neither increases nor decreases;
      perform control such that all of the exhaust gas is caused to pass the oxidation catalyst device, when the estimated proportion of $NO_2$ therein is not larger than 50%; and
      perform control such that part of the exhaust gas is caused to pass the bypass passage and the remaining part of the exhaust gas is caused to pass the oxidation catalyst device, when the estimated proportion of $NO_2$ therein is larger than 50%.

3. The NOx purification system according to claim 2, wherein:
   the controller is configured to estimate a proportion of $NO_2$ in the exhaust gas which flows into the selective reduction type NOx catalyst device, and when the estimated volume of adsorbed $NO_2$ decreases, the controller is configured to estimate the proportion of $NO_2$ in the exhaust gas which flows out of the oxidation catalyst device based on a condition of an equilibrium composition between NO and $NO_2$ which is determined by a temperature of the oxidation catalyst device and an oxygen concentration in the exhaust gas.

4. The NOx purification system according to claim 2, wherein:
   when the controller causes the part of the exhaust gas to pass the bypass passage, and the remaining part of the exhaust gas to pass the oxidation catalyst device, the controller is configured to control an amount of the exhaust gas to be allowed to pass the bypass passage in order that the proportion of $NO_2$ which flows into the selective reduction type NOx catalyst device becomes equal to 50%.

5. The NOx purification system according to claim 4, wherein:
   the controller is configured to estimate a proportion of $NO_2$ in the exhaust gas which flows into the selective reduction type NOx catalyst device, and when the estimated volume of adsorbed $NO_2$ decreases, the controller is configured to estimate the proportion of $NO_2$ in the exhaust gas which flows out of the oxidation catalyst device based on a condition of an equilibrium composition between NO and $NO_2$ which is determined by a temperature of the oxidation catalyst device and an oxygen concentration in the exhaust gas.

6. A method of controlling a NOx purification system configured to reduce NOx contained in an exhaust gas, the system including:
   an oxidation catalyst device, a first valve, and a selective reduction type NOx catalyst device which are arranged in order from an upstream side of an exhaust gas passage, the first valve to supply an ammonia-based solution to the exhaust gas passage;
   a bypass passage branching from the exhaust gas passage at an upstream side of the oxidation catalyst device and joining together with the exhaust gas passage at an upstream side of the first valve;
   at least one second valve to control a flow rate of the exhaust gas which flows through the bypass passage, and
   a controller,
   the method comprising utilizing the controller to perform the following steps:
   calculating volumes of NOx respectively in stages before and after the oxidation catalyst device,
   estimating whether a volume of $NO_2$ adsorbed in the oxidation catalyst device increases or decreases on a basis of the calculated volumes of NOx,
   controlling a flow rate of the exhaust gas which passes the oxidation catalyst device and a flow rate of the exhaust which passes the bypass passage on a basis of the increase or decrease in the estimated volume of adsorbed $NO_2$, and
   controlling an amount of the ammonia-based solution to be supplied by the first valve.

7. The method of controlling a NOx purification system according to claim 1, wherein:
   when the estimated volume of adsorbed $NO_2$ increases, the flow rate of the exhaust gas which passes the bypass passage is set to zero;
   when the estimated volume of adsorbed $NO_2$ decreases, part of the exhaust gas is caused to pass the bypass passage, and the remaining part of the exhaust gas is caused to pass the oxidation catalyst device;
   when the estimated volume of adsorbed $NO_2$ neither increases nor decreases, a proportion (molar ratio) of $NO_2$ in NOx contained in the exhaust gas which flows out of the oxidation catalyst device is estimated;
   when the estimated proportion of $NO_2$ therein is not larger than 50%, all of the exhaust gas is caused to pass the oxidation catalyst device; and when the estimated proportion of $NO_2$ therein is larger than 50%, part of the exhaust gas is caused to pass the bypass passage, and the remaining part of the exhaust gas is caused to pass the oxidation catalyst device.

8. The method of controlling a NOx purification system according to claim 7, wherein:

a proportion of $NO_2$ in the exhaust gas which flows into the selective reduction type NOx catalyst device is estimated, and when the estimated volume of adsorbed $NO_2$ decreases, the estimation of the proportion of $NO_2$ in the exhaust gas which flows out of the oxidation catalyst device is based on a condition of an equilibrium composition between NO and $NO_2$ which is determined by a temperature of the oxidation catalyst device and an oxygen concentration in the exhaust gas.

9. The method of controlling a NOx purification system according to claim 7, wherein:, when the part of the exhaust gas is caused to pass the bypass passage and the remaining part of the exhaust gas is caused to pass the oxidation catalyst device, an amount of the exhaust gas to be allowed to pass the bypass passage is controlled in order that the proportion of $NO_2$ which flows into the selective reduction type NOx catalyst device becomes equal to 50%.

10. The method of controlling a NOx purification system according to claim 9, wherein:

a proportion of $NO_2$ in the exhaust gas which flows into the selective reduction type NOx catalyst device is estimated, and when the estimated volume of adsorbed $NO_2$ decreases, the estimation of the proportion of $NO_2$ in the exhaust gas which flows out of the oxidation catalyst device is based on a condition of an equilibrium composition between NO and $NO_2$ which is determined by a temperature of the oxidation catalyst device and an oxygen concentration in the exhaust gas.

* * * * *